United States Patent
Gorelik et al.

(10) Patent No.: US 7,783,893 B2
(45) Date of Patent: Aug. 24, 2010

(54) SECURE BIOMETRIC AUTHENTICATION SCHEME

(76) Inventors: Victor Gorelik, 254 73 St., Apt. C1, Brooklyn, NY (US) 11209; Alexander Fursenko, 8520 Fort Hamilton Pkwy., Apt. 3D, Brooklyn, NY (US) 11209

( * ) Notice: Subject to any disclaimer, the term of this patent is extended or adjusted under 35 U.S.C. 154(b) by 1154 days.

(21) Appl. No.: 11/175,839

(22) Filed: Jul. 6, 2005

(65) Prior Publication Data
US 2007/0011464 A1    Jan. 11, 2007

(51) Int. Cl.
*G06F 21/00* (2006.01)
(52) U.S. Cl. .................. 713/186; 713/182; 726/2; 726/21
(58) Field of Classification Search .......... 713/186
See application file for complete search history.

(56) References Cited

U.S. PATENT DOCUMENTS

| | | | |
|---|---|---|---|
| 6,185,316 B1 * | 2/2001 | Buffam | 382/115 |
| 6,542,608 B2 * | 4/2003 | Scheidt et al. | 380/44 |
| 7,120,607 B2 * | 10/2006 | Bolle et al. | 705/64 |
| 2003/0219121 A1 * | 11/2003 | van Someren | 380/44 |
| 2005/0120228 A1 * | 6/2005 | Gorelik | 713/186 |

OTHER PUBLICATIONS

"Microsoft Computer Dictionary Fifth Edition", copyright 2002, p. 480.*

* cited by examiner

*Primary Examiner*—Ponnoreay Pich

(57) ABSTRACT

A method of secure biometric authentication is disclosed that shuffles arrays of biometric data in a sequence determined by user's secret input. The user is authenticated by comparing arrays of biometric data shuffled on the client side with the arrays of biometric data stored on the server side and shuffled in the very same sequence. Additional layer of security is provided by second shuffling in accordance with a number generated on the server and transmitted to the client after encoding with the user's public key/string retained on the server during enrollment. Real biometric data and sequences of shuffling are neither stored not transmitted anywhere; therefore, the privacy of the user is guaranteed. Security of the data transmitted to the server is not relevant because an attacker does not know the user's private key which is repeatedly recreated on the client from the real biometric data of the user.

3 Claims, 5 Drawing Sheets

Verification process.

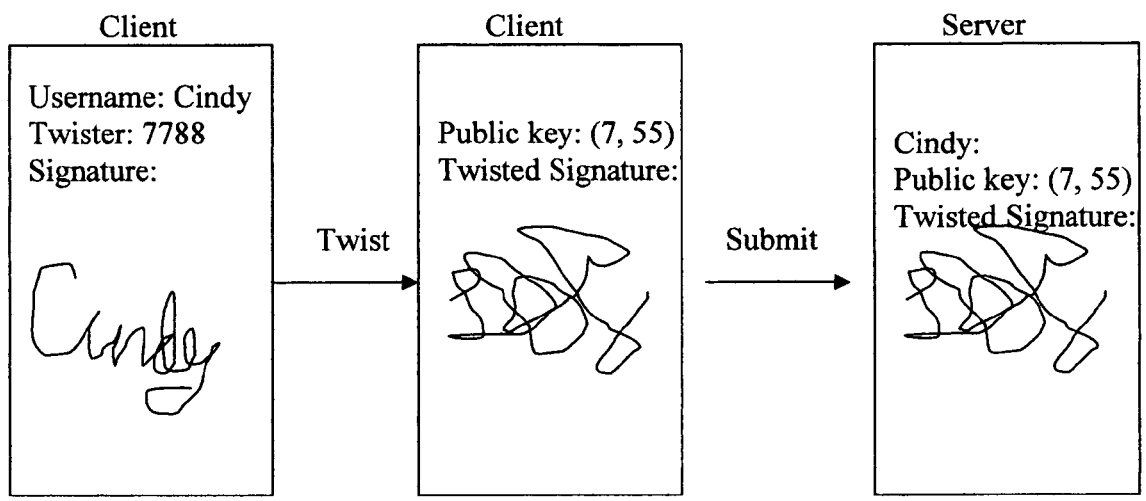
FIG. 1. Process of enrollment.

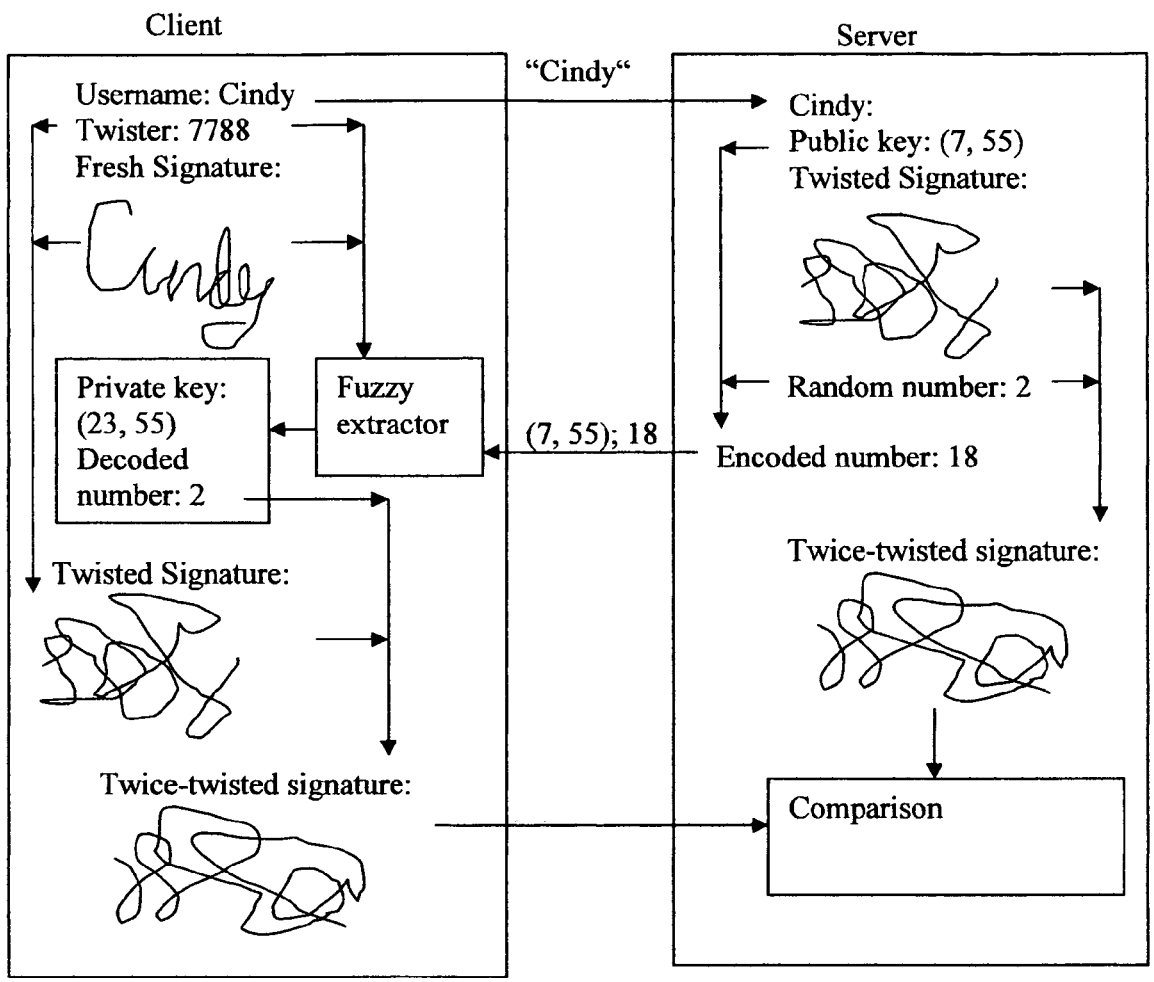
FIG. 2 Verification process.

Real signature:
$x_0, x_1, x_2, \ldots, x_{97}, x_{98}, x_{99}$
$y_0, y_1, y_2, \ldots, y_{97}, y_{98}, y_{99}$ X shift = 22
Y shift = 44

Twisted signature:
$x_{22}, x_{23}, x_{24}, \ldots, \ldots, \ldots, x_{99}, x_0, x_1, \ldots \; x_{19}, x_{20}, x_{21}$
$y_{44}, y_{45}, y_{46}, \ldots, y_{99}, y_0, y_1, \ldots, \ldots, \ldots, y_{41}, y_{42}, y_{43}$ FIG. 3 Shuffling sequence to transform the actual signature into the twisted one.

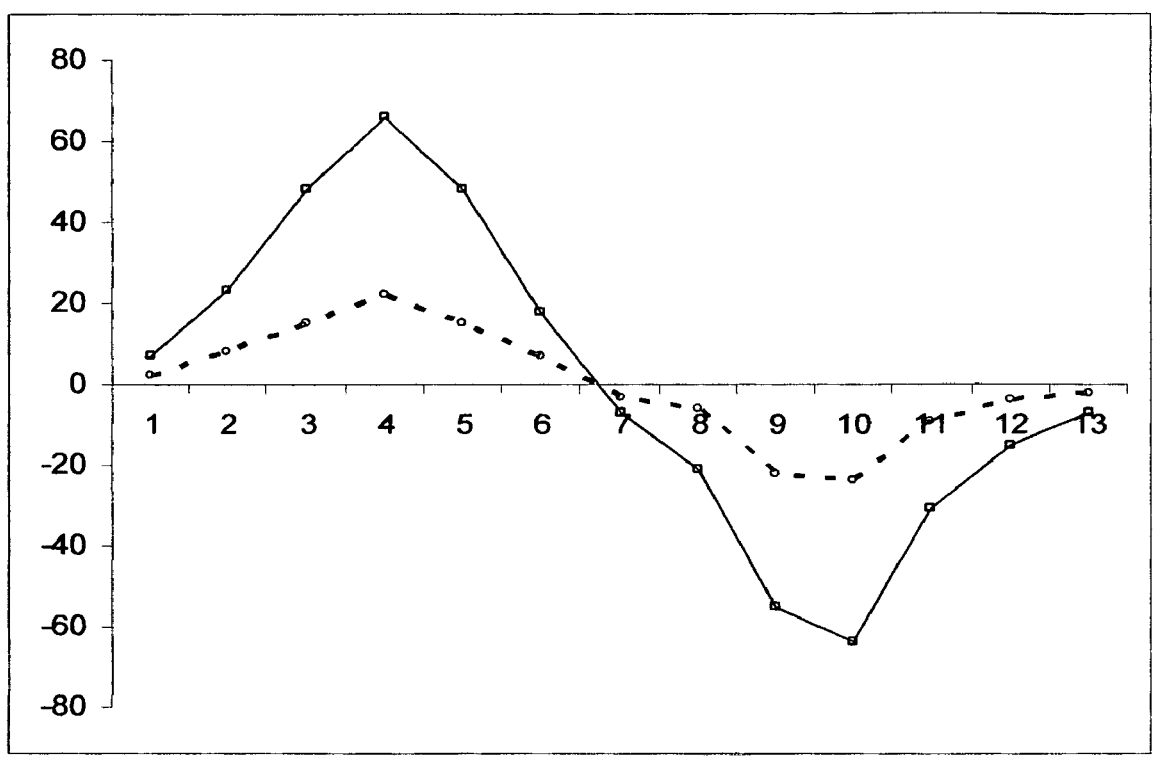
FIG. 4. Comparison of two twisted signatures.

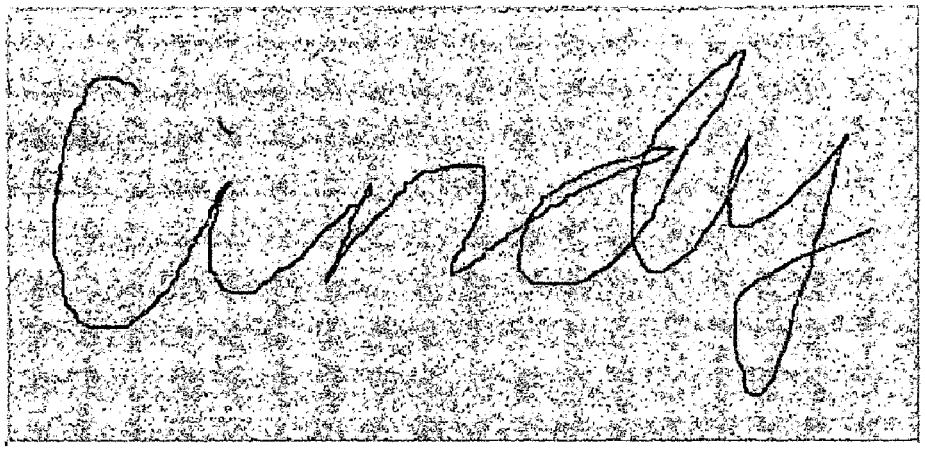
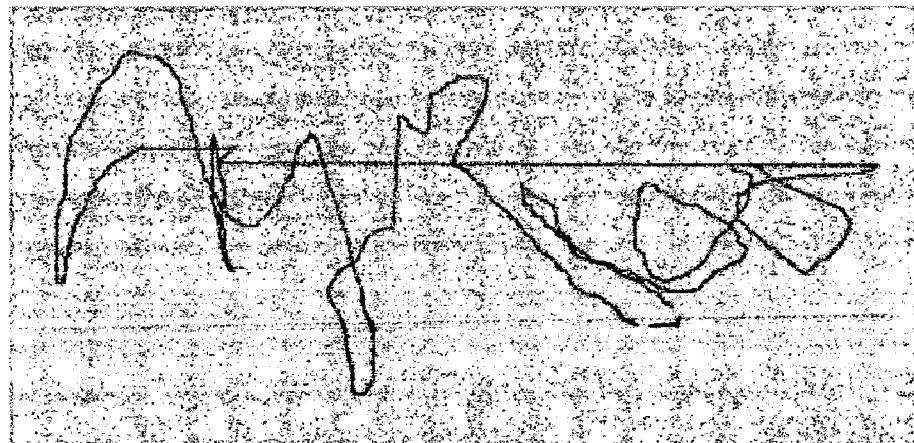
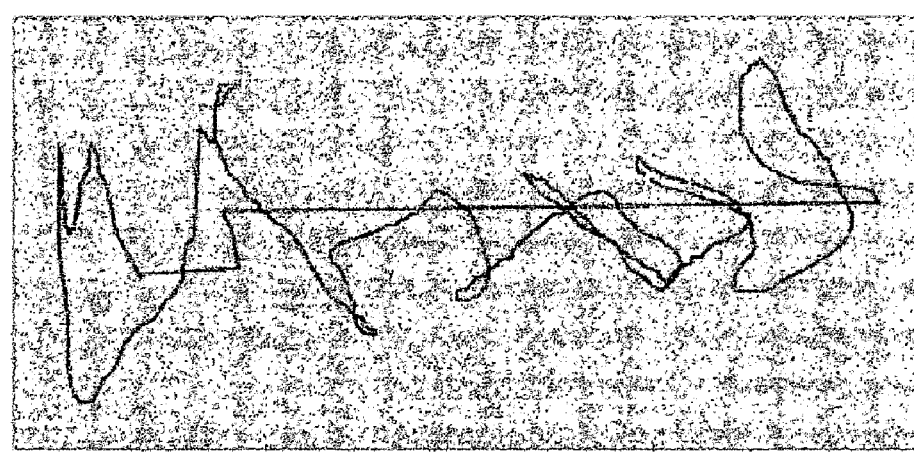
FIG. 5. Actual, twisted and twice-twisted signatures.

SECURE BIOMETRIC AUTHENTICATION SCHEME

CROSS REFERENCE TO RELATED APPLICATIONS

This application is related to U.S. patent application Ser. No. 10/725,116, filed on Dec. 2, 2003, and entitled TWISTED SIGNATURE, to Victor Gorelik.

STATEMENT REGARDING FEDERALLY SPONSORED RESEARCH AND DEVELOPMENT

Not applicable.

REFERENCE TO SEQUENCE LISTING, A TABLE, OR A COMPUTER PROGRAM LISTING COMPACT DISC APPENDIX

Not applicable.

FIELD OF THE INVENTION

This invention relates to the field of secure client-server communication. More specifically, this invention relates to using shuffled biometric data in asymmetric encoding/decoding authentication scheme and then using this data in secure and privacy-preserving business transactions even where security of data transmitted to a server cannot be assumed during transmission or subsequent storage.

BACKGROUND OF THE INVENTION

Public key cryptography (Asymmetric Cryptography, e.g. RSA) is a method of secure communication where one key is used for encryption and another for decryption. This method is heavily used in modern client-server transactions.

Biometric characteristic is an intrinsic characteristic of a person that is used to authenticate the person's identity: voice, fingerprint, retina scan, handwrite signature and so on. An authentication system tests whether the query biometric data is close or not to the stored biometric data associated with the claimed identity.

Authentication of a person is used in many business transactions including transactions over public networks such as the Internet. Despite numerous authentication schemes, neither privacy nor security is guaranteed in such transactions.

PROBLEMS WITH THE PRIOR ART

Authentication methods in client-server communication are based on using mathematical encryption and/or biometric sampling.

Mathematical encryption has two main types: symmetrical and asymmetrical. Problems with the prior art will be illustrated here on the example of one of the asymmetrical methods—RSA (U.S. Pat. No. 4,405,829).

RSA makes use of three numbers: a module, for example 55, a public key, for example 7, and a private key, for example 23. The module and the public key should be known to anyone who sends a message—in order to encrypt it; the private key should be known only to the person receiving the message. Actually this person generates all three numbers and publishes two of them (the module and the public key). The pair of the module and the public key are simply referred to as the public key; the pair of the module and the private key—as the private key.

Message may be presented as an integer number. A sender encrypts this number, for example 2, in the following way:

$$2^7 \bmod 55 = 128 \bmod 55 = (2*55+18) \bmod 55 = 18,$$

and sends the result—number 18, to a receiver. The receiver decrypts the result using his private key:

$$18^{23} \bmod 55 = 18^1 * 18^2 * 18^4 * 18^{16} \bmod 55 = 825552 \bmod 55 = 2,$$

and gets the number encrypted by the sender—number 2.

For any given public key there is only one private key, which gives the correct result for any message. If a public key is 2-digit or 1-digit number like 55 and 7, it is easy to find out the corresponding private key. However, if this number is 100-digit or better 1000-digit, it is virtually impossible to calculate the corresponding private key. That is why nobody except the person who generated all three numbers can decrypt the messages (but it is still easy to generate long private and public keys).

This scheme has two main drawbacks.

The first drawback is related to the anonymous character of communication based on RSA. The identity of a person who has published the public key is unknown, so there could be a legal issue related, for example, to a dispute over whether or not a contract has been signed by a user. This drawback has been resolved in series of works devoted to building a fuzzy extractor—an algorithm for extracting keys from biometric data; see cryptology ePrint Archive: Report 2004/176 by Andrew Burnett, Adam Duffy and Tom Dowling. The scheme proposed in the report ensures that a biometric reading provided by the alleged signer would be enough to verify the signature.

The second drawback of RSA is related to the possibility of breaking it. Despite the fact that mathematically it is virtually impossible to find out the private key, tomorrow's mathematical ideas and technical tools may change the situation. Besides, real-life implementation of RSA (storing of long numbers in computer memory for example) allows some non-mathematical tools like hacking, bribery and blackmail to be successfully used.

Those realities dictate strict requirements for verifying the identity of a user including explicit use of his biometric characteristics (as opposed to implicit use of biometric characteristics described above in connection with fuzzy extractors). Biometric samples are stored on a server during enrollment process and then they are compared against biometric samples submitted during authentication request. A security breach of the biometrics transmitted to or stored at the server in this case leads to the total loss of the user's biometrics: they can be used neither currently nor in the future on any server. Besides, the user's interests may be harmed during the period of time from the moment of the security breach at the server till the moment it is discovered.

According to U.S. Pat. No. 6,507,912 January 2003 by Matyas Jr. et al., sampling of biometric characteristics may be performed on client side using the key transmitted from the server to the client. The authentication can be done by comparing key-dependent samples collected during the enrollment process against key-dependent data submitted during the authentication request. This is only a partial solution of the problem because the key and the rule of transformation may be revealed as a result of a breach of server security. Besides, the user's interests may be harmed during the period of time from the moment of the security breach at the server till the moment it is discovered.

A similar solution is proposed in US Patent Application 20040019570 January 2004 by Bolle R. M et al. The transformation is used to create a distorted biometric. The distorted biometric is used to identify a user without requiring the user to provide actual physical characteristics about himself. This is a partial solution as well due to the nature of the proposed distortion. For example, according to this solution, image of a fingerprint is divided into nine rectangles which are switched with each other and turned to 90, 180 or 270 degrees. The process of recognition is based on extracting so-called features, such as a ridge bifurcation in a fingerprint, which are sub-characteristics of the overall signal. Based on these features, a more compact template representation is built and used for identification. So the proposed distortion does not destroy features, which characterize the user, and hence does not solve completely the privacy problem in case of server security being compromised. Besides, the user's interests may be harmed during the time range from the moment of the security breach at the server till the moment it is discovered.

SUMMARY OF THE INVENTION

The object of this invention is provided by sampling a biometric characteristic of a user on a client and shuffling extracted arrays of biometric data on the client. The sequence of shuffling is calculated on the basis of a "twister"—a secret number or word or other information known only to the user. The result is a "once-twisted signature"—shuffled arrays of biometric data.

During the enrollment process, the samples of once-twisted signatures are transmitted to the server and stored on the server. Real signatures are not stored anywhere and are never transmitted anywhere. Also during the enrollment process, the user's public key is generated on the client from the user's real signature with the help of a fuzzy extractor. This public key and the public string from which it is generated are transmitted to the server and stored on the server.

During subsequent connections to the server, the user's username is transmitted from a client to the server. The server locates the public key corresponding to the submitted username, generates a random number, encodes it using the user's public key and sends it back to the client along with the public key/string.

On the client, the user's private key is recreated from the user's real signature with the help of a fuzzy extractor. This private key is used to decode the encoded random number received from the server. After that, the real signature is shuffled on the client twice—first time in a sequence determined by the twister known only to the user (by the same rules as it was done during enrollment), second time—the resulting twisted signature is shuffled in a sequence determined by the random number generated on the server. The twice-twisted signature is then transmitted to the server.

On the server, user's once-twisted signature is extracted from the database and twisted second time using the random number which was sent to the client. The result is compared against the twice-twisted signature received from the client. The method of comparison guarantees that the result of comparison does not depend either on particular twister used by the user, or on particular number generated on the server; the result depends on whether the real signature used during enrollment closely matches the real signature used during the authentication process or not.

The advantage of the present invention is improved privacy of the user. It is guaranteed explicitly by one-way shuffling of biometric arrays on the client side using the input known only to the user, so there is no way to restore the real signature or its biometric features from intercepted or stolen twisted signatures. Another advantage is that the security required of the server is less crucial. Even if an attacker can steal all information stored on the server, he cannot decode the number sent from the server to the client because he does not have the private key (which is not stored anywhere, but is repeatedly recreated on the client side from the real biometric of the user). So, the attacker cannot generate correctly the twice-twisted signature even if he knows the once-twisted signature.

BRIEF DESCRIPTION OF THE DRAWINGS

FIG. 1 illustrates the process of enrollment.
FIG. 2 illustrates the verification process.
FIG. 3 illustrates the process of transformation the actual signature into the twisted one.
FIG. 4 illustrates the process of comparison of two twisted signatures.
FIG. 5 illustrates actual, twisted and twice-twisted signatures.

DETAILED DESCRIPTION OF THE INVENTION

The present invention will now be described more fully using some specific examples of the implementation, see also U.S. patent application Ser. No. 10/725,116, filed on Dec. 2, 2003, and entitled TWISTED SIGNATURE, by Victor Gorelik. The present invention may, however, be embodied in many different forms and should not be construed as limited to the provided examples.

In particular, the present invention may be embodied as systems (apparatus), methods and/or computer program products, or as an embodiment combining software and hardware aspects.

As mentioned above, the present invention is valid for different types of biometric data like voice, fingerprints, retina scan and so on. For purposes of illustration only, the handwriting signature is chosen.

FIG. 1 illustrates the process of enrollment.

The first step is to extract arrays of values from a real biometric characteristic on the client side. For example, a user signs an on-line form using a computer mouse.

The second step of enrollment is to use a fuzzy extractor to calculate a public key/string on the basis of this real signature. User's secret twister (for example number "7788") may be used as an additional input for calculations.

The same twister is used to transform the real signature into a twisted one (see central part of FIG. 1) on the client side. The deployed transformations will be explained later in this description.

Both calculation of public key/string and transformation of the real signature may be triggered by clicking button "Twist" of the on-line form.

The last step of the enrollment process is submitting the twisted signature and public key/string to the server, for example, by clicking a button "Submit" on the on-line form. The twisted signature and the public key/string are stored on the server under the user's username, for example "Cindy".

FIG. 2 illustrates the verification process.

The first step of verification process is the submission of the user's username from a client to the server.

The server responds by locating the public key corresponding to the submitted username, generating a random number, for example 2, encoding this number using the user's public key, for example (7,55), and sending the result (18) to the client along with the values of public key/string.

During the next step of verification, the user signs the on-line form, and enters the same twister as he used during the enrollment ("7788" in our example).

Client uses fuzzy extractor and all known information (the real signature obtained on the client during verification, the received public key/string, and, optionally, the "twister") to recreate the private key ((23, 55) in our example). This private key is used to decode the encoded random number received from the server. The result of decoding in our example is 2. In many cases, it would be enough for verification purposes to send this result to the server and make sure it matches the number generated there. However, as mentioned in "Problems with the prior art", the private key may be eventually constructed from the public key, so explicit use of biometric data in the next steps (see below) increases security of the verification.

During the next step of verification, the real signature is twisted for the second time on the client side. The first transformation is done with the help of the user's twister ("7788"). The result of this transformation is transformed with the help of the random number received from server (2 in our example). The resulting twice-twisted signature is submitted to the server. The server uses the random generated number (2 in our example) to transform the once-twisted signature stored in the server's database, and compares the result of this twisting against the twice-twisted signature received from the client. The method of comparison will be explained later in this description. The result of the comparison is expressed as a coefficient between −100% and 100%. If the coefficient is close to 100%, verification is granted.

The following is an explanation of how to transform the actual signature into the twisted one on the client side (or the once-twisted signature into the twice-twisted one) and how to compare two twice-twisted signatures on the server side.

The actual signature can be presented as 3 arrays:

$$x_0, x_1, x_2, \ldots, x_{N-1},$$

$$y_0, y_1, y_2, \ldots, y_{N-1},$$

$$t_0, t_1, t_2, \ldots, t_{N-1},$$

where $x_i$ and $y_i$ are mouse coordinates at the moment $t_i$, and N is the number of the mouse coordinates during the process of signing the Form. For purposes of illustrating, the pace of signing (array $t_0, t_1, t_2, \ldots, t_{N-1}$) and additional characteristics (like z-pressure as a function of time) are not considered. Only two arrays: x-array and y-array are considered below; they determine the shape of the signature completely. (Other types of biometric data can also be presented as several arrays of numbers and similar procedures are applied.)

FIG. 3 illustrates the process of transformation of the actual signature into the twisted one on the client side. The same algorithm can be used to transform the once-twisted signature into the twice-twisted signature.

There are N!*N! ways in which the real signature can be twisted by shuffling the original arrays $\{x_0, x_1, x_2, \ldots, x_{N-1}\}$ and $\{y_0, y_1, y_2, \ldots, y_{N-1}\}$. To choose one of the ways the user enters the twister ("7788" in our example). Each character in the word has a numerical value, ASCII code, for example. The sum of these values is equal to 222 in our example. If N is known, let us say, N=100, the value of "shift" 222% 100=22 can be calculated.

The original array $\{x_0, x_1, x_2, \ldots, x_{N-1}\}$ corresponding to the real signature is replaced by the new array:

$x_0$ is replaced by $X_{22}$, $x_1$ is replaced by $X_{23}$,

. . . , $x_{77}$ is replaced by $X_{99}$, $x_{78}$ is replaced by $x_0$, $x_{79}$ is replaced by $x_1$, and so on.

The original array $\{y_0, y_1, y_2, \ldots, y_{N-1}\}$ corresponding to the real signature is replaced by the new array using double shift: 44 instead of 22. This way of shuffling creates a twisted signature, each point of which has x-coordinate equal to x-coordinate of one point of the real signature and y-coordinate equal to y-coordinate of another point of the real signature.

FIG. 4 illustrates the process of comparison of two twisted signatures.

To compare two actual (not twisted) signatures, the technique of correlation coefficients can be used (Miller at al. *John E. Freud's mathematical statistics*, Prentice Hall, N.J., 1999). Let $C_x$ be the correlation coefficient between the arrays $$x1=\{x1_0, x1_1, x1_2, \ldots, x1_{N-1}\},$$

$$x2=\{x2_0, x2_1, x2_2, \ldots, x2_{N-1}\},$$

of x-coordinates of the first and second actual signatures; and let $C_y$ be the correlation coefficient between arrays $$y1=\{y1_0, y1_1, y1_2, \ldots, y1_{N-1}\}$$

$$y2=\{y2_0, y2_1, y2_2, \ldots, y2_{N-1}\}$$

of y-coordinates of the first and second actual signatures. If both $C_x$ and $C_y$ are close to 100% (or their average is close to 100%), these two signatures are close.

Methods of calculating $C_x$ and $C_y$ are identical, so only the case of $C_x$ is described.

Calculation of the correlation coefficient between two arrays x1 and x2 consists of 3 steps.

In the first step, the graphic of each array is shifted in the vertical direction so that the average value of each new array is equal to zero, see FIG. 4.

If two original arrays x1 and x2 have exactly the same shape, then new arrays X1 and X2 will have the following property: if, for example, $X1_5$ is positive, then $X2_5$ is positive as well; if $X1_9$ is negative, then $X2_9$ is negative as well, and so on.

The second step is the calculation of the product is as follows:

$$X1_0 * X2_0 + X1_1 * X2_1 + \ldots + X1_{N-1} * X2_{N-1} \qquad (1)$$

If original arrays x1 and x2 have the same shape, each term in this expression will be positive (negative multiplied by negative is positive) and the sum will be big. If the original arrays are not exactly the same, but have similar shapes, then most of the terms will be positive and the sum will still be big.

The third step is normalization. Normalization ensures that the correlation coefficient between two arrays of exactly the same shape will be equal to 100%; the coefficient between two arrays of opposite shape (upside down) will be equal to −100%; the coefficient between two arrays of very different shape (between "signal" and "noise") will be close to zero.

The important point to note is that if we shuffle the sequence of the coordinates in the first array x1 and the sequence of the coordinates in the second array x2 in exactly the same way, we do not change the correlation coefficient, because the sum (1) does not depend on the order of the items. That is why signatures twisted by shuffling can be used instead of actual ones.

The level of what "is close to 100%" is established on the basis of statistical characteristics of signatures and on the level of desired security. Table 1 contains correlation coefficients of x and y-arrays for 6 twisted signatures of one person. The first number in each cell of the table corresponds to the x-coefficient; the second number corresponds to the y-coefficient.

TABLE 1

Correlation coefficients between 6 twisted signatures of one person.

| Signature | $1^{st}$ | $2^{nd}$ | $3^{rd}$ | $4^{th}$ | $5^{th}$ |
|---|---|---|---|---|---|
| $2^{nd}$ | 81 86 | | | | |
| $3^{rd}$ | 49 77 | 73 90 | | | |
| $4^{th}$ | 84 89 | 87 93 | 73 90 | | |
| $5^{th}$ | 46 67 | 64 51 | 74 37 | 64 55 | |
| $6^{th}$ | 67 79 | 73 65 | 88 61 | 81 71 | 78 66 |

The correlation coefficients between the corresponding actual signatures (or between corresponding twisted or corresponding twice-twisted signatures) are absolutely the same.

Comparison of Person2's twisted signature with six twisted signatures of Person1 gives:

(0, 6); (−12, −11); (−28, −15); (−21, −4); (−5, 3); (−12, 23).

Comparison of Person3's twisted signature with six twisted signatures of Person1 gives:

P (71, 5); (61, 0); (41, −1); (60, −3); (53, 12); (48, 24).

In the described example, the level of 70% for correlation coefficient may be used. If the coefficient between twice-twisted signature obtained on the client and twice-twisted signature obtained on the server is greater then 70%, verification is granted. At first glance the level of 70% does not look big enough to make sure we have the same signature. However, in the verification process, there is the first step needed to be done before calculations: the user has to indicate her username ("Cindy"), after that the server uses information stored under name "Cindy". This makes results much more reliable.

The method of comparison guarantees that the result of comparison does not depend either on a particular twister used by the user, or on a particular number generated on the server; the result depends on whether the real signature used during enrollment closely matches the real signature used during authentication process or not (because a comparison of two different signatures before twisting gives the same correlation coefficient as a comparison of these two signatures after twisting).

The described method of comparison allows to perform additional twisting: corresponding terms of two signatures ($X1_i$ and $X2_i$) may be multiplied by the same number $C_i$. The correlation coefficient of these two signatures before and after twisting will also be equal to the correlation coefficient of these two signatures after twisting.

The advantage of the present invention is the improved privacy of the user. It is guaranteed explicitly by one-way shuffling of biometric arrays on the client side using input known to the user only, so there is no way to restore the real signature or its biometric features from intercepted or stolen twisted signatures.

Another advantage is that security required of the server is less crucial. Even if an attacker can steal all information stored on server, he cannot decode the number sent from the server to the client because he does not have the private key (which is not stored anywhere, but is repeatedly recreated on the client from the real biometric of the user). The attacker cannot generate the twice-twisted signature correctly even if he knows the once-twisted signature. So, the user's interests will not be harmed during the time period from the moment of a breach of the server security till the moment the breach is discovered.

Another example of the present invention's possible embodiment is a system where the server and the client are implemented in one device and are not using a public network for communication. In this kind of systems, the server is a subsystem storing twisted samples of biometric data and making decisions regarding verification and/or identification of a client. The client is a subsystem collecting biometric data, twisting this data and submitting twisted data to the server. For example, teller machines may store a public key/string and a twisted biometric of a customer, generated based on a real biometric characteristic and a secret code known only to the customer. The server does not know this secret code; only the person who submits his/her biometric along with this code knows it. After a twisted biometric characteristic is generated on the client, the secret code and the real biometric characteristic are not needed anymore, so they are not stored anywhere. Even in the case of a breach of server security, the customer is risking only his twice-twisted biometric characteristic saved on the server. For other applications, the customer is using the same real biometric characteristic along with a different secret code.

In the drawings and specification above, there have been disclosed typical embodiments of the invention and, although specific terms are employed, they are used in a generic and descriptive sense only and not for purposes of limitation.

We claim:

1. A method of secure biometric authentication comprising the steps of enrollment of:

extracting arrays of values from a handwritten signature of a user on a client, extracting a public key/string from the arrays of values of the handwritten signature, shuffling the arrays of values of the real handwritten signature in accordance with a secret input known only to the user—to obtain a "twisted signature", submitting the public key/string, the twisted signature, and a username from the client to a server, where the submitted public key/string, twisted signature, and username are stored;

and the steps of verification of:

submitting a user name from a client (the "verification client") to the server, locating on the server the public key/string corresponding to the username submitted during the steps of verification, generating a random number on the server, encoding the random number generated on the server using the located public key/string, sending from the server to the verification client the encoded random number generated on the server and the public key/string retained on the server during the steps of enrollment and used to encode the random number generated on the server, receiving on the verification client the encoded random number generated on the server and the public key/string retained on the server during the enrollment process and used to encode the random number generated on the server, performing fresh extraction of arrays of values of a handwritten signature at the verification client, extracting a private key on the verification client from the arrays of values of the handwritten signature obtained during verification, using the public key/string received from the server, decoding the encoded random number received from the server using the private key extracted on the verification client, shuffling the arrays of values of the handwritten signature obtained during verification in the sequence determined by the secret input used during enrollment to obtain a "twisted verification signature", shuffling the arrays of values of the twisted verification signature in a sequence determined by the decoded random number to obtain a "twice-twisted client-side signature", submitting the twice-twisted client-side signature from the verification client to the server, shuffling the arrays of values of the twisted signature stored on the server in the sequence determined by the random number, which was sent to the verification client during verification, to obtain a "twice-twisted server-side signature", comparing the twice-twisted client-side signature with the twice-twisted server-side signature on the server, granting authentication or authorization request of the user if the comparison of the twice-twisted client-side signature with the twice-twisted server-side signature on the server results in a match or denying authentication or authorization request of the user if the comparison of the twice-twisted client-side signature with the twice-twisted server-side signature on the server does not result in a match.

2. The method, as in claim 1, where the enrollment and verification steps are used or operated by any one or more of the following: a user, a company, a bank, a service or transaction processing company, a credit card company, a government, or a computer while dealing with a financial instrument, a service, a contract, a sale, a bid, an account number, an authorization, an identification, a reservation request, a purchase, or a quote; or an access to or authority to manipulate a physical structure, financial or any other account, database, or information; or a request for a privilege, a request for a network service, an offer for a network service, an auction, and an enrollment.

3. A system for secure biometric authentication comprising means for performing the steps of enrollment and means for performing the steps of verification as described in claim 1.

* * * * *